Dec. 30, 1947.  H. E. CARNAGUA ET AL  2,433,428
TORQUE RESPONSIVE CLUTCH
Filed June 26, 1943  4 Sheets-Sheet 1

Inventors:
Harold E. Carnagua
John M. Simpson
By: Edward C. Fitzbaugh
Atty.

Patented Dec. 30, 1947

2,433,428

UNITED STATES PATENT OFFICE 2,433,428

TORQUE RESPONSIVE CLUTCH

Harold E. Carnagua and John M. Simpson, Muncie, Ind., assignors to Borg-Warner Corporation, Chicago, Ill., a corporation of Illinois Application June 26, 1943, Serial No. 492,374

15 Claims. (Cl. 192—53)

Our invention relates to coupling devices and has as its general object to provide a positive coupling device adapted to be employed, in connection with suitable controls, for effecting an automatic shift from one gear ratio to another gear ratio in a transmission in which the gearing may be generally of a conventional type and in which other shifts may be operator-energized. As an example of the type of control mechanism that is contemplated, reference is made to copending application Serial No. 492,376 of Harold E. Carnagua and Maurice N. Bareham.

More specifically, the invention contemplates a positive clutch mechanism which is adaptable to an arrangement, in an otherwise conventional manually shifted motor vehicle transmission, wherein the shift from a lower speed ratio to a higher ratio is effected automatically (as in response to a decelerating torque load transmitted from the lower ratio driving member to the clutch mechanism) and wherein the downshift from the higher ratio to the lower ratio may be effected by the torque responsive means under the control of the operator (as in moving the engine throttle control in throttle opening direction). To this end the invention provides means for locking the clutch mechanism in the higher ratio position, the locking means being adapted to be unlocked in conjunction with establishing (by opening the engine throttle) a forward driving torque on the torque responsive mechanism by which the clutch mechanism is shifted away from the higher ratio position.

A further object is to provide for automatic locking of the clutch mechanism in the higher ratio position as soon as that position is attained. In order to attain this object, the locking means is constantly biased toward the locking position by yielding means which is overcome by manual control in the unlocking operation.

Another object of the invention is to provide a clutch mechanism of the type indicated, wherein both the lower and the higher ratio drives are established by a unitary clutch member which is selectively shiftable into clutching connection with either of two driving members. This is accomplished by providing a shift sleeve for transmitting to the clutch member the manual shift from neutral to lower ratio and vice versa, and a locking collar, adapted to lock the shift sleeve to the clutch member for the said manual shift and also for the lockup in the higher ratio, both shift sleeve and locking collar being carried by the clutch member so as to permit the clutch member at one time to be locked to the shift sleeve so as to be manually shifted thereby and at another time to be released therefrom for torque responsive shifting while the shift sleeve forms a fixed support for the locking collar.

A further object of the invention is to provide a positive clutch having a torque responsive shift between two adjacent drive positions, having a remote neutral position, and having means associated directly therewith for locking it in at least one of the drive positions, rendering the torque responsive mechanism inoperative.

These and other objects and features of this invention will become apparent from the following specification when taken together with the accompanying drawings in which.

As an example of one form in which the invention may be embodied we have shown in Figs. 1 to 6 inclusive, a synchronizer for establishing a driving connection selectively between direct driving member 10 (or second-speed driving member 12) and driven shaft 14 of a conventional change speed transmission wherein the driving member 10 is formed with a gear 16 which meshes with a gear 18 (shown schematically) on a countershaft 20, the countershaft 20 carrying a gear 22 which meshes with a gear 24 on the second-speed driving member 12.

The drive is transmitted to the driven shaft 14 through the medium of a shiftable jaw clutch member 26 splined to the driven shaft 14 and carrying jaw clutch teeth 28 adapted to mesh with jaw clutch teeth 30 on the direct drive member 10 and jaw clutch teeth 32 adapted to mesh with jaw clutch teeth 34 on the second-speed drive member 12.

The teeth 28, 30, 32 and 34 may be basically of involute design, although alternate teeth 30 and 34 are cut away for a purpose which will be explained hereinafter.

Figure 1:
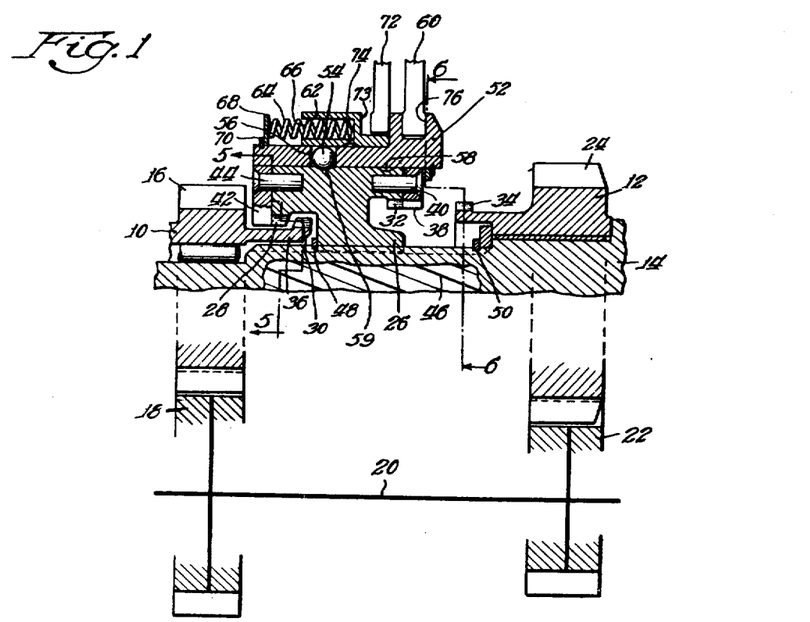
Fig. 1 is an axial sectional view of a synchronizer embodying the invention, in neutral position.

In order to facilitate the automatic shift between the two drive positions, the neutral position of the synchronizer is disposed at one side of the drive positions. Referring now to Fig. 1, which shows the clutch in the neutral position, it may be noted that the clutch teeth 30 are carried on the end of an extended sleeve portion 36 of the driving member 10, which sleeve portion has an external diameter somewhat less than the base diameter of the clutch teeth 30, and that in the neutral position, the clutch teeth 28 of the shiftable jaw member encircle the neck portion 36 between the clutch teeth 30 and the gear 16. In passing to the second-speed position shown in Fig. 2, the clutch teeth 28 will pass through the clutch teeth 30 and in proceeding to the direct drive position shown in Fig. 3, the clutch teeth 28 will move back into engagement with the clutch teeth 30 without moving through the neutral position.

Figures 5, 6:
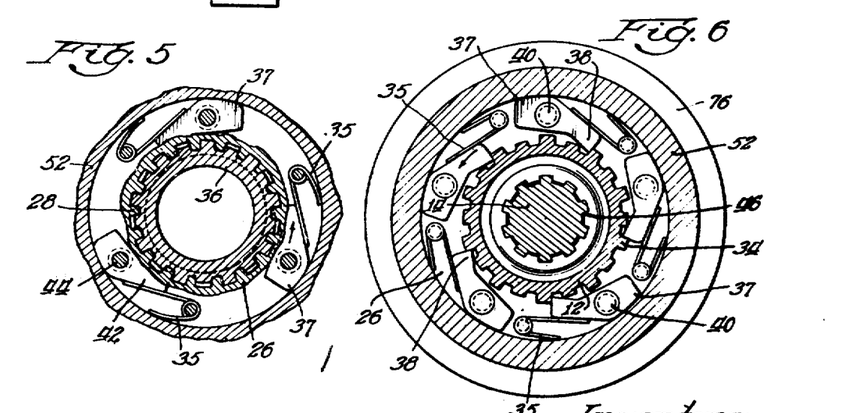
Fig. 5 is a transverse sectional view of the same taken on the line 5—5 of Fig. 1.
Fig. 6 is a transverse sectional view of the same taken on the line 6—6 of Fig. 1.
Figures 7, 8:
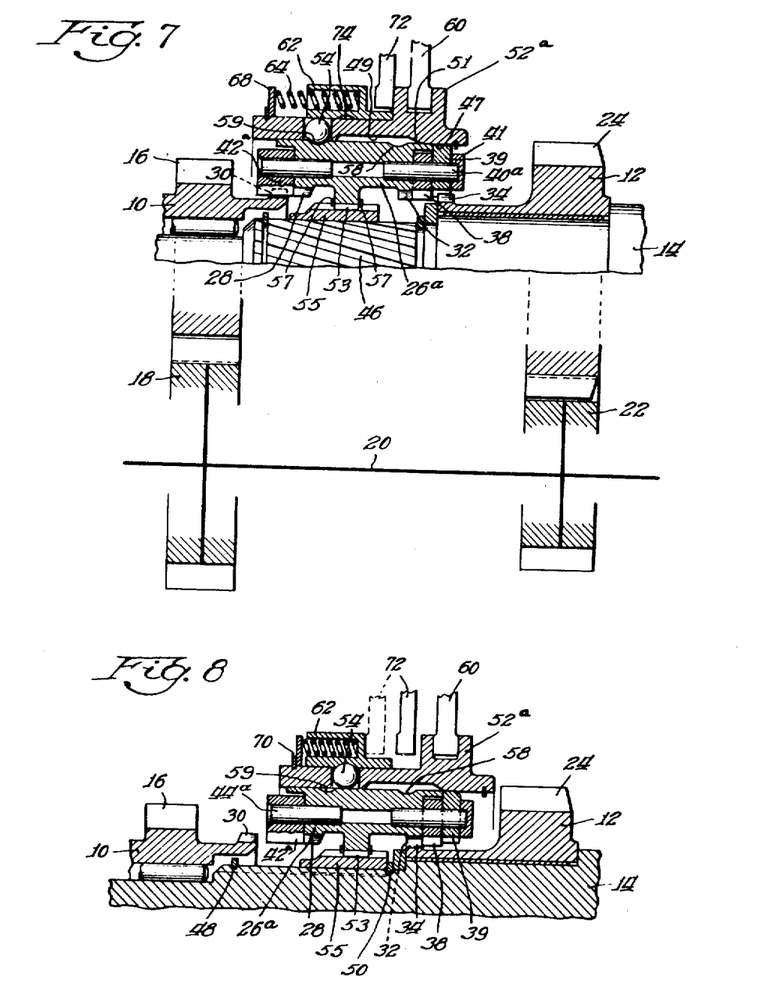
Fig. 7 is an axial sectional view of a modified form of the invention, in the neutral position.
Fig. 8 is an axial sectional view of the same in the second-speed position as arrived at in the shift from neutral.

In the shift to the second-speed ratio, synchronization of the clutch teeth 32 with the clutch teeth 34 is effected by synchronizer pawls 38 pivoted on pins 40 mounted in the jaw member 26. As shown in Fig. 6, the pawls 38, viewed from the rear, have ratcheting ends extending clockwise and adapted to ratchet against the clutch teeth 34 when the driven member 14 is rotating faster than the second-speed driving member 12 in the forward direction indicated by the arrow in Fig. 6. The ends of the pawls 38 register with the near extremities of spaces between the teeth 32. The same relationship exists between the pawls 42 and the teeth 28 of the direct drive synchronizer, as shown in Fig. 5. Positive engagement of the clutch teeth 34 by the pawls 38 (when the driving member 12 is accelerated and tends to rotate ahead of the driven member) will line up the clutch teeth 32 with the spaces between the clutch teeth 34 so as to permit the clutch teeth 32 to move smoothly into clutching engagement with the teeth 34 without interference from the latter. It may be noted at this point that alternate clutch teeth 30 and 34 are of reduced height to provide spaces in which the pawls 42 and 38 may project into engagement with the intervening clutch teeth.

The direct drive synchronizer pawls 42 are pivoted on pins 44 mounted in the jaw member 26. As shown in Fig. 5, the pawls 42, viewed from the rear, extend counterclockwise so that positive engagement of the pawls 42 with the teeth 30 is established when the jaw member 26 carrying the pawls commences to rotate faster than the driving member 10 in the forward direction as indicated by the arrow in Fig. 5.

Figure 2:
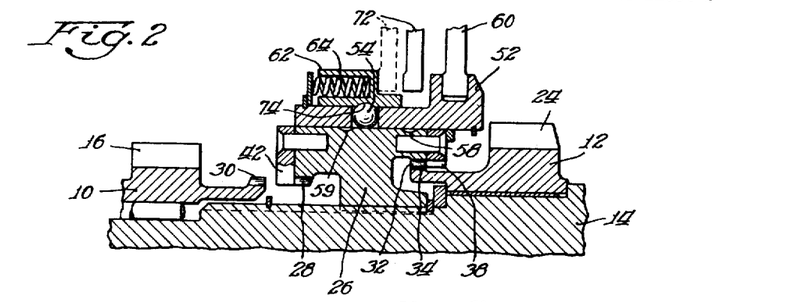
Fig. 2 is an axial sectional view of the same in the second-speed position as arrived at in the shift from neutral.
Figure 3:
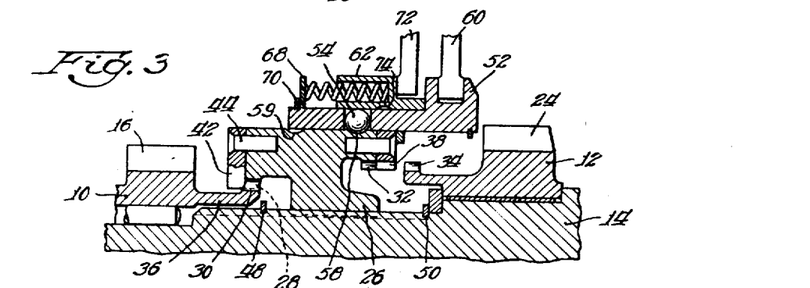
Fig. 3 is an axial sectional view of the same in the direct drive position.

For torque responsive shifting of the jaw member 26, we provide a helically splined connection 46 between the jaw member 26 and the driven member 14. The jaw member 26 is adapted to move axially between the limits shown in Figs. 1 and 2 respectively, said limits being determined by stop rings 48 and 50 respectively, mounted in the driven member 14. Movement of the jaw member 26 from the second-speed position to the direct drive position is effected by decelerating the engine and the second-speed driving member 12 connected thereto, so as to establish a forward coast torque on the driven member 14. The coast torque is transmitted through the teeth 32 and 34 to the member 12 which is under deceleration load. The result of these two opposing forces, reacting on the helically splined connection 46, is a movement of the jaw member 26 to the left until the teeth 32 and 34 are disengaged. In this position of the jaw member 26, which is intermediate the second-speed and direct drive positions of Figs. 2 and 3 respectively, the pawls 42 will have moved to ratcheting engagement with the teeth 30, and the pawls 38 into ratcheting engagement with the teeth 34. Ratcheting of the pawls 42 will commence immediately upon engagement with the teeth 30, since the jaw member 26 will be rotating behind the driving member 10 as long as it is clutched to the driving member 12 (which is geared to rotate slower than the driving member 10 at all times). Ratcheting of the pawls 38 will commence as soon as the teeth 32 and 34 are completely disconnected and the decelerating load on the drive member 12 commences to decelerate the latter with reference to the coast driven jaw member 26. While both synchronizers are ratcheting, the torque reaction will be interrupted and jaw member 26 will pause in its axial movement. The pawls 42 and 38 will continue to ratchet until deceleration has reached a point where the speed of the jaw member 26 is synchronized with that of the driving member 10, and the jaw member 26 commences to rotate ahead of the driving member 10, whereupon the pawls 42 will engage the direct drive clutch teeth 30, aligning the teeth 28 with the spaces between the teeth 30, restoring the torque reaction in the splined connection 46, and thereby continuing the movement of the jaw member 26 to the left until the teeth 30 and 28 are in full engagement as shown in Fig. 3. Further movement of the jaw member in this direction will be arrested by the lock-up mechanism which will shortly be described.

In downshifting from direct to second, forward driving torque is maintained on the driving members 10 and 12, and the torque reaction of the helically splined connection 46 moves the jaw member 26 to the right. The jaw member 26 will pause in the intermediate position, with both sets of pawls ratcheting, while the driving member 12 accelerates to the speed of the jaw member 26 and commences to rotate ahead of the latter, whereupon the teeth 34 of the driving member 12 will engage the pawls 38, the torque reaction on the helically splined connection 46 will again become effective, and the teeth 32, now lined up with the spaces between the teeth 34, will move into full engagement with the latter.

The lock-up mechanism is for the purpose of holding the jaw member 26 in direct drive position, rendering the helically splined connection 46 inoperative. It includes a shift sleeve 52 encircling and axially shiftable on the periphery of the jaw member 26. A plurality of locking elements 54 are caged in openings 56 in the shift sleeve 52 and adapted to engage in an annular groove 58 in the periphery of the jaw member 26 for locking the jaw member 26 to the sleeve 52 in the direct drive position shown in Fig. 3. A control member such as the shift fork 60, engaged in an annular channel 76 formed on the sleeve 52, functions both for shifting the sleeve 52 and for holding it, and with it the jaw member 26, against axial movement in the direct drive position of Fig. 3. The jaw member 26 is provided with a second annular groove 59 in which the locking elements 54 are adapted to engage for transmitting shifting thrust from the sleeve 52 to the jaw member 26 in shifting from the neutral to the second-speed position. A locking collar 62 serves to lock the elements 54 in the grooves 59 and 58, as shown in Figs. 1 and 3 respectively.

The locking collar 62 is urged toward its locking position by a series of coil springs 64 which are received in bores 66 therein and engaged against an abutment washer 68 which in turn is engaged against a snap ring 70 mounted in the shift sleeve 52. The locking collar 62 is adapted to be moved to the left against the resistance of the springs 64, by means of a control member such as the shift fork 72, adapted to engage a shoulder 73 on the locking ring 62. Such movement of the locking collar 62, when the sleeve 52 is stationary, or movement of the sleeve 52 to the right while the collar 62 is held stationary by the fork 72, brings an annular groove 74, in the inner surface of the locking collar 62, into registry with the locking elements 54, permitting the latter to move out of the groove 58 or 59, as the case may be, and freeing the jaw member 26 for movement within the shift sleeve 52.

In the operation of the synchronizer shown in Figs. 1 to 6 inclusive, shift from neutral to second-speed gear ratio is accomplished by moving the shift fork 60 manually to the right. The jaw member 26, which is locked to the shift sleeve 52 as shown in Fig. 1, will thus be shifted to the right, the clutch teeth 28 and pawls 42 passing through the direct drive clutch teeth 30. The movement to the right is continued until the pawls 38 engage the second-speed clutch teeth 34. Assuming that the shift is made when none of the parts are rotating (for example, when the vehicle in which the transmission is embodied is at rest and the engine clutch is disengaged) the pawls 38 may possibly dead-end against the teeth 34. If this occurs, the condition is rectified by momentarily engaging the clutch so as to rotate the driving member 12 slightly while pressure is maintained against the shift fork 60, until the pawls move into the spaces between the teeth 34. As the pawls 38 thus move into the plane of the teeth 34, they will be drivingly engaged by the teeth 34, lining up the clutch teeth 32 with the spaces between the teeth 34. When the teeth 32 and 34 have become fully engaged, the shifting movement of the jaw member 26 is arrested by engagement of the latter against the stop ring 50.

During the movement of the sleeve 52 to the right, the collar 62 will engage the shift fork 72 (which is held stationary at this stage of operation) and will be stopped thereby while the sleeve 52 continues its movement to the right, compressing the springs 64 until the groove 74 registers with the locking elements 54 and permit the latter to move out of the groove 59. Meanwhile, pressure is maintained against the shift fork 60, and as soon as the sleeve 52 is unlocked from the jaw member 26 its movement to the right is continued (while the clutch member 26 remains arrested by ring 50) until it reaches the second-speed position shown in Fig. 2, in which the locking elements 54 are engaged against the cylindrical periphery of the jaw member 26 and thus locked in engagement with the groove 74 of the locking ring. This locks the locking ring to the shift sleeve 52 with the spring 64 biasing it toward the right, and the pressure on the shift fork 72 may be and is released. The transmission is now in second speed ratio and power is transmitted through the countershaft and the second-speed drive member 12 to the jaw member 26 and thus to the driven shaft 14.

The shift fork 60 is now locked in the second-speed position shown in Fig. 2, so as to position the sleeve 52 for subsequently locking the clutch member 26 in the direct drive position.

The shift from second speed to direct drive is accomplished automatically in response to deceleration of the driving member 12, the coast torque on the driven member 14—reacting through the helically splined connection 46 against the jaw member 26 against the deceleration load to which the latter is subjected first by the second-speed driving member 12 and subsequently by the direct drive member 10—causing the jaw member 26 to first shift out of clutching engagement with the second-speed clutch teeth 34, pause while the speed of the driving member 10 is decelerated to that of the driven member, and then shift on into clutching engagement with the direct drive clutch teeth 30, all as described in detail hereinbefore.

As the jaw member 26 thus moves to the left, the shift sleeve 52 will be restrained by the shift fork 60, which is locked in a fixed position as stated above, and when the jaw member 26 reaches the direct drive position shown in Fig. 3, the locking elements 54 will engage in the groove 58 of the jaw member 26, being forced therein by the camming action of the locking collar 62 under the urge of the springs 64. As soon as the locking elements have thus entered the groove 58, the locking collar 62 will be free to move to the right under the urge of the springs 64, and will do so, reaching the position shown in Fig. 3 and thus locking the elements 54 in engagement with the groove 58. Thus, the driven member 26 is restrained from moving beyond the direct drive position into neutral, since the shift sleeve 52 continues to be locked in fixed position by the fork 60 and the locking mechanism acting thereon.

With the shift sleeve 52 still locked in fixed position, the transmission may be "kicked down" or semi-automatically shifted back to second-speed position by accelerating the driving members 10 and 12, and shifting the fork 72 to the left against the compression of the springs 64 until the groove 74 registers with the locking elements 54, unlocking the jaw member 26 from the shift sleeve 52. Thereupon the jaw member 26 will, under the forward drive torque transmitted to it from first the direct drive teeth 30 and subsequently the second-speed drive teeth 34, move to the intermediate, ratcheting position, pause therein until the speed of the drive member 12 has been accelerated to that of the jaw member 26, then move on into clutching engagement with the second-speed teeth 34, all as explained in detail hereinbefore.

Return to neutral from second speed is accomplished by unlocking the shift fork 60 and manually shifting the sleeve 52 to the left, first registering the locking elements 54 with the groove 59 and locking the sleeve 52 to the hub 26, then moving the hub 26 to the left with the sleeve 52, until the neutral position is reached.

It will now be apparent that the mechanism of our invention may be readily adapted to an arrangement wherein the downshift from direct drive to second-speed gear ratio may be accomplished simply by depressing the accelerator pedal of a motor vehicle having a suitable linkage between the accelerator and the shift fork 72, such that acceleration of the driving member 12 and movement of the fork 72 to the left will occur substantially simultaneously. Such a control arrangement is shown in the copending application, Serial No. 492,376 of Harold E. Carnagua and Maurice N. Bareham.

Figure 4:
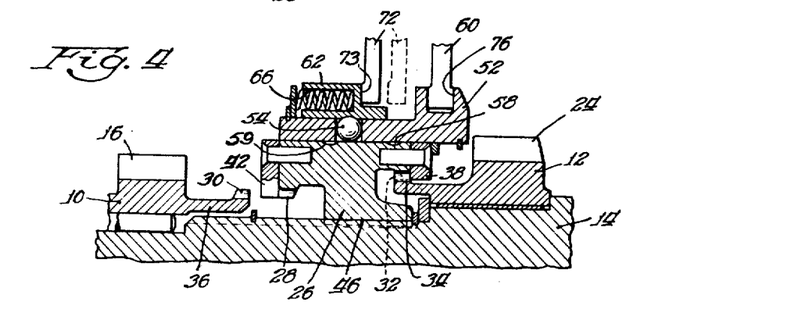
Fig. 4 is an axial sectional view of the same in the second-speed position as arrived at in the downshift from direct drive.

As indicated in Fig. 4, in the "kickdown" to second speed the fork 72 is maintained in engagement with the locking ring 62 until the latter is locked to the shift sleeve 52 by the cylindrical periphery of the jaw member 26 which has moved into engagement with the locking elements as the jaw member is shifted to the right.

Returning now to Fig. 2, it will be noted that the shift fork 72 is shown, in full lines, out of engagement with the locking ring 62. This is to indicate that the movement of shift sleeve 52 to the second-speed position in the shift from neutral to second speed is completed after the shift fork 72 has been returned to its inoperative position shown in full lines from the operative position shown in dotted lines.

The pawls 38 and 42 are each urged toward their operative, engaging position by springs 35, and are restrained from moving inwardly beyond said operating position, by the engagement of tail members 37 thereon against the inner periphery of the shift sleeve 52.

In Figs. 7 to 12 inclusive, we have shown a modification of our invention, which is the same in construction and operation and is designated by the same reference numerals as the form of the invention described above, with the following exceptions:

The neutral position instead of being at one side of the two driving positions, is disposed between them as in a conventional synchronizer, but the arrangement is such as to permit, nevertheless, the torque responsive shift of the jaw member 26a back and forth between the two driving positions, without having a torque responsive shift from neutral to second or vice versa.

To this end, we provide, adjacent the pawls 38, an auxiliary set of pawls 39, the pawls 38 and 39 being arranged in pairs each pivoted on a pin 40a and retained by a retainer ring 41 pressed on the outer end of the pins 40a. In the neutral position shown in Fig. 7, the pawls 39 are maintained in raised positions out of engagement with the clutch teeth 34 with which they are registered, so that only the direct drive pawls 42a (of double width, pivoted on pins 44a) are engaged. The pawls 39 are maintained in their raised positions by engagement of their tail portions 45 with the inner surface 47 of the shift sleeve 52a when the latter is in its left hand position with reference to the jaw clutch member 26a, determined by engagement of the poppet balls 54 in the groove 59.

In the shift from the neutral position to the second speed position, the shift sleeve 52a is urged to the right by the yoke 60 and the clutch member 26a, locked to the sleeve 52a by the engagement of poppet balls 54 in the groove 59, will be shifted with the sleeve 52a. The pawls 38, which extend clockwise as viewed from the rear (Fig. 12) will function to facilitate the meshing of the teeth 32 and 34, the shift being started with the second speed drive member 12 rotating more slowly than the driven shaft 14 (resulting in ratcheting of the pawls 38 against the teeth 34 as they move into operative registry therewith), and being completed by accelerating the driving member 12 until the teeth 34 engage the pawls 38, whereupon the jaw clutch member 26a will be permitted to complete the shift to the second speed position shown in Fig. 8. The clutch sleeve 26a (which is splined at 53 to a hub member 55 between snap rings 57 inset in the hub member 55, the hub member 55 being in turn splined through the torque responsive connection 46 to the driven shaft 14) will be stopped in the second speed position by the engagement of the hub 55 against the snap ring 50. The locking collar 62 will be arrested by engagement with the fork 72 (held stationary at this stage of operation) while the sleeve 52a continues to shift to the right against the compression of the springs 64 until the poppet balls 54 register with the groove 74 of the locking collar, and the shift sleeve 52a, thus unlocked from the clutch sleeve 26a, will be shifted on to the position shown in Fig. 8, and will be locked in this position through the lever 60, thus setting the parts for torque responsive action.

In the upshift from second speed to direct drive, the engine is decelerated, establishing a decelerating load on the driving members 10 and 12 while the driven shaft 14 continues to rotate under forward coast torque imparted to it from the vehicle wheels. This coast torque is transmitted to the clutch member 26a through the teeth 32 and 34, and reacts in the helically splined connection 46 to shift the sleeve 26a toward the left within the shift sleeve 52a, until the teeth 32 and 34 are disengaged. The pawls 42a are of sufficient width to register with the teeth 30, not only in the neutral position of Fig. 7, but also in the intermediate position arrived at by the clutch member 26a upon disengagement of the teeth 32 and 34. In this intermediate position, the pawls 42a and 38 will ratchet until the driving member 10 has been decelerated to the point where the clutch sleeve 26a commences to rotate ahead of the member 10, whereupon the pawls 42a will engage the teeth 30, reestablishing the torque reaction that was broken by the disengagement of the teeth 32 and 34. The sleeve 26a will thereupon complete its shift to the direct drive position shown in Fig. 9.

Figure 9:
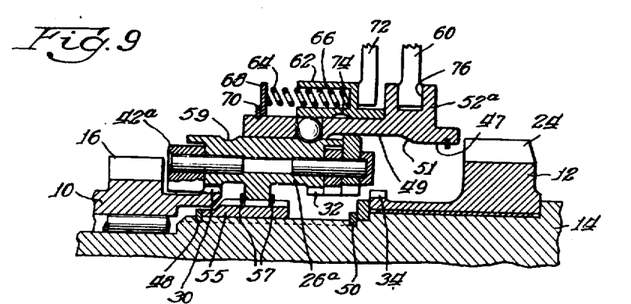
Fig. 9 is an axial sectional view of the same in the direct drive position.
Figure 10:
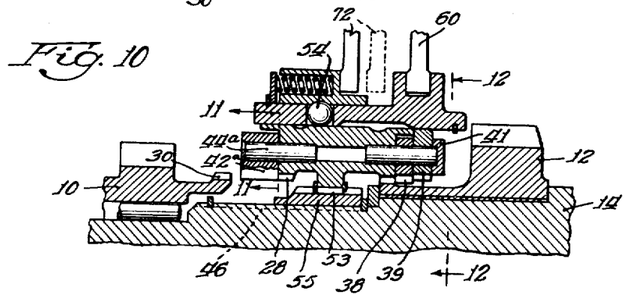
Fig. 10 is an axial sectional view of the same in the second-speed position as arrived at on the downshift from direct drive.
Figure 11:
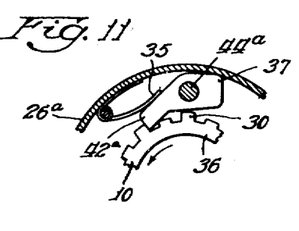
Fig. 11 is a transverse sectional view of the same taken on the line 11—11 of Fig. 10.
Figure 12:
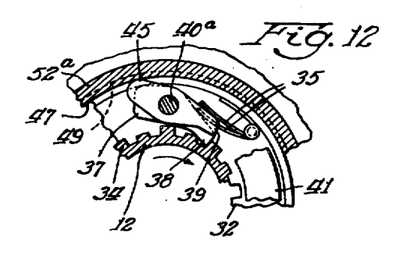
Fig. 12 is a transverse sectional view of the same taken on the line 12—12 of Fig. 10.

As the sleeve 26a shifts to the direct drive position, the pawls 39 will move into a counterbore 49 in the sleeve 52a, which permits the pawls 39 to move inwardly to their operative positions shown in Fig. 9.

When the clutch member 26a reaches the direct drive position, the poppet balls 54 will enter the groove 58 and the collar 62 will move to the locking position, as shown in Fig. 9.

In the downshift from the direct drive position to the second speed position, the locking collar 62 is moved, through the medium of the yoke 72, to the unlocking position while the engine is accelerated.

The accelerating load thus placed upon the driving member 10 is transmitted from the teeth 30 through the teeth 28 to the clutch member 26a, causing the latter to shift toward the right within the sleeve 52a until the teeth 28 are disengaged from the teeth 30 whereupon the driving member 10 will commence to rotate ahead of the clutch member 26a, with the pawls 42a ratcheting. The pawls 39 will in the meantime have moved into registry with the teeth 34, and will ratchet thereon until the speed of the direct drive member 12 is accelerated to the point where it commences to exceed that of the clutch member 26a. The pawls 39 will then engage the teeth 34, reestablishing the torque reaction and causing the sleeve 26a to continue its shifting movement toward the right. As the pawls 39 move out of mesh with the teeth 34, the drive will be picked up by the pawls 38 and thus the torque reaction will continue until the pawls 42a are disengaged from the teeth 30, and the teeth 32 and 34 are in full mesh.

In the movement of the clutch member 26a to the second speed position, the pawls 39 will be cammed out of the counterbore 49 by a camming shoulder 51 in the shift sleeve 52a and into engagement with the surface 47 which holds the pawls 39 in their inoperative positions.

While we have described our invention in connection with one specific embodiment thereof it is to be understood that this is by way of illustration and not by way of limitation and the scope of our invention is defined solely by the appended claims which should be construed as broadly as the prior art will permit.

We claim:

1. In a jaw clutch, in combination with a pair of coaxial rotatable members to be coupled, a jaw clutch sleeve drivingly connected to one of said members and shiftable axially into positive coupling engagement with the other member, means for locking said jaw clutch sleeve in said coupling engagement and including a radially shiftable locking element and a control collar encircling said jaw clutch sleeve and adapted to engage said locking element and to maintain the same in a jaw clutch sleeve locking position, yielding means acting between said collar and said jaw clutch member and constantly biasing said collar toward its locking position, and means for shifting said control collar between said locking position and a position where it permits said locking element to shift radially to release said jaw clutch sleeve for shifting movement.

2. In a synchronizer, in combination with a pair of coaxial rotatable torque transmitting members to be synchronized one of which is provided with clutch teeth, a toothed clutch sleeve drivingly connected to the other member and shiftable axially into mesh with said clutch teeth, a ratchet synchronizer interposed between said sleeve and clutch teeth and adapted, upon a change in relative speed between said members whereby the faster rotating member tends to become the slower rotating member, to position said sleeve for free movement into mesh with said clutch teeth means including, a radially movable locking element adapted when the element is in an inward position to lock said sleeve in mesh with said clutch teeth, a control collar carried by said sleeve and shiftable axially between a position wherein it confines said locking element in said inward locking position and a position wherein it permits said locking element to move outwardly to free said sleeve for shifting movement, and means for shifting said sleeve.

3. In a jaw clutch, in combination with a pair of coaxial rotatable members to be coupled, a jaw clutch sleeve having a torque responsive connection with one of said members adapted, in response to transmission of torque therethrough to shift said sleeve axially into positive coupling engagement with the other member, means for locking said jaw clutch sleeve in coupling engagement and including a radially shiftable locking element and a control collar encircling said jaw clutch sleeve and adapted to engage said locking element and to maintain the same in a position wherein it locks said jaw clutch sleeve in said coupling engagement, yielding means acting between said collar and said jaw clutch member and constantly biasing said collar toward its locking position, and means for shifting said control collar between said locking position and a position where it permits said locking element to shift radially to release said jaw clutch sleeve for shifting movement, said last means being manually controlled.

4. In a coupling, in combination with a pair of relatively rotatable members to be coupled, a coupling member adapted for positive coupling connection with one of said members, means drivingly connecting said coupling member to the other member and adapted, in response to torque transmitted therethrough, to shift said coupling member into and out of said coupling connection, a shift member carried by and axially shiftable on said coupling member and having an opening, said coupling member having a recess registrable with said opening, a locking element radially movable in said opening for engagement in said recess to lock said coupling member to said shift member, means for shifting said shift member and with it said coupling member, when thus locked, from a noncoupled position to a position from which said coupling member may shift torque responsively, a control element, having a recess, embracing said shift member and axially shiftable thereon from a position wherein said locking element is maintained thereby in locking engagement with the coupling member recess to a position wherein the locking element may move into the recess of said control element to free the coupling member for shifting movement with reference to the shift member, and means for shifting said control element.

5. In a coupling, in combination with a pair of relatively rotatable members to be coupled, a coupling member adapted for positive coupling connection with one of said members, means drivingly connecting said coupling member to the other member and adapted, in response to torque transmitted therethrough, to shift said coupling member into and out of said coupling connection, a shift member carried by and axially shiftable on said coupling member and having an opening, said coupling member having a recess registrable with said opening, a locking element radially movable in said opening for engagement in said recess to lock said coupling member to said shift member, means for shifting said shift member and with it said coupling member, when thus locked, from a non-coupled position to a position from which said coupling member may shift torque responsively, a control element, having a recess, embracing said shift member and axially shiftable thereon from a position wherein said locking element is maintained thereby in locking engagement with the coupling member recess to a position wherein the locking element may move into the recess of said control element to free the coupling member for shifting movement with reference to the shift member, means yieldingly biasing said control element toward the locking position and means for shifting said control element to the unlocking position.

6. In a positive coupling, in combination with a pair of members, one rotatable relative to the other and a third member, rotatable relative to said pair of members, coupling means adapted for positive coupling connection with either of said pair of members and having a torque responsive driving connection with said third member adapted, under torque transmitted therethrough in opposite directions, to move said coupling means respectively into and out of coupling connection with one of said pair of members, locking means for locking said coupling means in the coupling position and including a locking control element, means constantly biasing said locking element toward its locking position, and operator controlled means for moving said locking element to an unlocked position wherein said coupling means is released for uncoupling movement.

7. In a coupling, in combination with a pair of relatively rotatable members to be coupled, one of which is provided with coupling teeth, a jaw element having teeth meshable with said coupling teeth, a synchronizer interposed between said jaw element and coupling teeth and adapted upon a change in relative speed between said members whereby the faster rotating member tends to become the slower rotating member to render said teeth indexed for meshing by said jaw element, means drivingly connecting said jaw element to the other member and adapted, in response to torque transmitted therethrough, to shift said jaw member into mesh with said coupling teeth, a shift member carried by and axially shiftable with reference to said jaw element, means including a locking element for locking the jaw element to the shift member, and a control member shiftable with reference to said shift member from a position wherein it is adapted to render said locking element operative to lock said jaw element to said shift member, to a position wherein it permits said locking element to free said jaw element for movement independent of said shift member.

8. In a synchronizing clutch, in combination with three rotatable torque transmitting members, means for selectively coupling one of said members to either of the other members, comprising coupling teeth on each of said other members, a jaw element having teeth meshable with said coupling teeth, means drivingly connecting said jaw element to said one member and adapted, in response to torque transmitted therethrough in one rotational direction, to shift said jaw element away from meshing engagement with one set of coupling teeth and into meshing engagement with the other, and in response to torque transmitted therethrough in the opposite direction, to shift said jaw element away from meshing engagement with the last mentioned coupling teeth and into meshing engagement with the opposed set of teeth, a synchronizer interposed between said jaw element and each of said sets of coupling teeth and adapted, upon a change in relative speed between said jaw element and the set of coupling teeth toward which it is being shifted whereby the faster rotating of these parts tends to become the slower rotating, to index the teeth of said jaw element in meshable relation to the coupling teeth it is approaching, a shift member axially shiftable with reference to said jaw member, means including a locking element for locking said jaw member to said shift member, a control member shiftable with reference to said shift member from a position wherein it is adapted to render said locking element operative to lock said jaw member to said shift member, to a position wherein it permits said locking element to free said jaw element for movement independent of said shift member, and operator-controlled means for shifting and holding said shift member to and in a position from which said jaw member may shift torque responsively toward either of said sets of coupling teeth.

9. In a clutch, in combination with three rotatable torque transmitting members, means for selectively coupling one of said members to either of the others, comprising a set of clutch teeth carried by each of said other members, an axially shiftable clutch element having teeth meshable with either of said sets of clutch teeth, means drivingly connecting said clutch element to said one member and adapted, in response to torque transmitted therethrough in one direction, to shift said clutch element into mesh with one of said sets of teeth and in response to torque transmitted therethrough in the other direction to shift said clutch element into mesh with the other set of teeth, operator controlled means for shifting said clutch element from a neutral position to a position wherein said clutch element is released for torque responsive movement, and means for locking said clutch element in either of said meshing positions.

10. In a synchronizing clutch, in combination with three coaxial rotatable torque transmitting members, including a pair of driving members geared together to rotate together at different speeds and each having a set of clutch teeth, means for selectively coupling either of said driving members to the third of said members constituting the driven member, said means comprising a clutch member having teeth adapted to be coupled selectively to either of said sets of clutch teeth, means drivingly connecting said clutch member to said driven member and adapted, under torque transmitted therethrough in one direction, to move said clutch member into couple with one of said sets of teeth and in response to torque transmitted therethrough in the other direction to move the clutch member into couple with the other set of teeth, a pair of sets of ratchet pawls each adapted to be placed in operative registry with a set of clutch teeth toward which said clutch element is being moved torque responsively as the clutch element disengages the other set of clutch teeth and, upon a change in relative speed between the driven member and said driving member toward which the clutch element is moving whereby the faster rotating member tends to become the slower rotating member, to engage said set of clutch teeth with which it is registered, to arrest the rotation between said last mentioned members, to position the teeth of said clutch element for coupling with the adjacent set of clutch teeth, and to restore the transmission of torque through said connecting means for moving said clutch element into coupling engagement with said adjacent set of clutch teeth, means for automatically locking said clutch element in one of its coupling positions, upon arrival at said one position, operator-controlled means for moving said locking means into a position freeing said clutch element for torque-responsive movement, and operator- controlled means for moving said clutch element from a neutral, non-coupled position to the other of said coupling positions.

11. In a synchronizing coupling, in combination with a pair of driving members geared together to rotate at different speeds and a driven member, means for selectively coupling either of said driving members to said driven member comprising a set of clutch teeth carried by each of said driving members, a clutch element having teeth adapted to be coupled with either of said sets of clutch teeth, torque responsive means drivingly connecting said clutch element to said driven member and adapted, when said clutch element is coupled to one of said sets of clutch teeth and receiving torque therefrom in a given direction, to move said clutch element out of engagement with said one set of teeth and toward the other, and vice versa, a ratchet type synchronizer for each set of clutch teeth, each synchronizer becoming positioned for operation with respect to its respective set of clutch teeth when the clutch element has moved toward said set of clutch teeth and out of engagement with the opposite set of teeth, and being adapted, upon a change in relative speed between the driven member and the set of clutch teeth with which it has thus become operatively positioned whereby the faster rotating of these parts tends to become the slower rotating, to arrest the rotation between said parts, position the clutch element for coupling with said set of clutch teeth with which it has just become operatively positioned, and thereupon restore the torque through said torque responsive connection and complete the torque responsive movement of the clutch element into couple with said last mentioned set of clutch teeth, a shift element operatively associated with said clutch element, means for locking said shift element to said clutch element, operator-controlled means for moving said shift element, and with it said clutch element, from a non-coupled position to one of the coupled positions, and for holding the shift element and clutch element in such coupled position, and operator-controlled means for shifting said locking means to a position freeing said clutch element from said shift element for torque responsive shift of said clutch element.

12. A synchronizing coupling as defined in claim 10 wherein said shift element comprises a sleeve encircling said clutch element and having an opening, said locking means includes a locking collar axially shiftable on said shift sleeve, said collar and clutch element having recesses, a locking element confined between said collar and said clutch element in said opening and adapted to engage in the clutch element recess for locking said clutch element to said shift sleeve and in said collar recess for releasing the clutch element, and yielding means acting between said locking collar and said shift sleeve for biasing said collar toward a position in which said collar recess is out of registry with said locking element, said shifting means for the locking means being adapted to engage said collar and move it against the resistance of said yielding means.

13. In a coupling, in combination with a pair of relatively rotatable members to be coupled, one of which is provided with coupling teeth, a toothed coupling element drivingly connected to the other member and shiftable axially into mesh with said coupling teeth, a shift member embracing and axially shiftable on said coupling member and having an opening, said coupling member having a recess registrable with said opening, a locking element radially movable in said opening for engagement in said recess to lock said coupling member to said shift member, and a control element having a recess, said control element embracing and carried by said shift member and axially shiftable thereon from a position wherein said locking element is maintained thereby in locking engagement with the coupling member recess to a position wherein the locking element may move into the recess of said control element to free the jaw member for shifting movement with reference to the shift member.

14. A synchronizer as defined in claim 9, wherein said neutral position is disposed adjacent the higher speed coupling position and remote from the lower speed coupling position.

15. A synchronizer as defined in claim 9, wherein said neutral position is disposed between the two coupling positions.

HAROLD E. CARNAGUA.
JOHN M. SIMPSON.

REFERENCES CITED

The following references are of record in the file of this patent:

UNITED STATES PATENTS

| Number | Name | Date |
|---|---|---|
| 2,202,271 | Sinclair et al. | May 28, 1940 |
| 2,245,017 | Sinclair | June 10, 1941 |
| 2,140,100 | Boldt et al. | Dec. 13, 1938 |
| 2,008,967 | Rossman | July 23, 1935 |
| 1,904,563 | Strout | Apr. 18, 1933 |

Certificate of Correction

Patent No. 2,433,428. December 30, 1947.

HAROLD E. CARNAGUA ET AL.

It is hereby certified that errors appear in the printed specification of the above numbered patent requiring correction as follows: Column 9, line 56, claim 2, after the word "teeth" insert a comma; same line, after "including" strike out the comma; and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.* drivingly connecting said clutch element to said driven member and adapted, when said clutch element is coupled to one of said sets of clutch teeth and receiving torque therefrom in a given direction, to move said clutch element out of engagement with said one set of teeth and toward the other, and vice versa, a ratchet type synchronizer for each set of clutch teeth, each synchronizer becoming positioned for operation with respect to its respective set of clutch teeth when the clutch element has moved toward said set of clutch teeth and out of engagement with the opposite set of teeth, and being adapted, upon a change in relative speed between the driven member and the set of clutch teeth with which it has thus become operatively positioned whereby the faster rotating of these parts tends to become the slower rotating, to arrest the rotation between said parts, position the clutch element for coupling with said set of clutch teeth with which it has just become operatively positioned, and thereupon restore the torque through said torque responsive connection and complete the torque responsive movement of the clutch element into couple with said last mentioned set of clutch teeth, a shift element operatively associated with said clutch element, means for locking said shift element to said clutch element, operator-controlled means for moving said shift element, and with it said clutch element, from a non-coupled position to one of the coupled positions, and for holding the shift element and clutch element in such coupled position, and operator-controlled means for shifting said locking means to a position freeing said clutch element from said shift element for torque responsive shift of said clutch element.

12. A synchronizing coupling as defined in claim 10 wherein said shift element comprises a sleeve encircling said clutch element and having an opening, said locking means includes a locking collar axially shiftable on said shift sleeve, said collar and clutch element having recesses, a locking element confined between said collar and said clutch element in said opening and adapted to engage in the clutch element recess for locking said clutch element to said shift sleeve and in said collar recess for releasing the clutch element, and yielding means acting between said locking collar and said shift sleeve for biasing said collar toward a position in which said collar recess is out of registry with said locking element, said shifting means for the locking means being adapted to engage said collar and move it against the resistance of said yielding means.

13. In a coupling, in combination with a pair of relatively rotatable members to be coupled, one of which is provided with coupling teeth, a toothed coupling element drivingly connected to the other member and shiftable axially into mesh with said coupling teeth, a shift member embracing and axially shiftable on said coupling member and having an opening, said coupling member having a recess registrable with said opening, a locking element radially movable in said opening for engagement in said recess to lock said coupling member to said shift member, and a control element having a recess, said control element embracing and carried by said shift member and axially shiftable thereon from a position wherein said locking element is maintained thereby in locking engagement with the coupling member recess to a position wherein the locking element may move into the recess of said control element to free the jaw member for shifting movement with reference to the shift member.

14. A synchronizer as defined in claim 9, wherein said neutral position is disposed adjacent the higher speed coupling position and remote from the lower speed coupling position.

15. A synchronizer as defined in claim 9, wherein said neutral position is disposed between the two coupling positions.

HAROLD E. CARNAGUA.
JOHN M. SIMPSON.

REFERENCES CITED

The following references are of record in the file of this patent:

UNITED STATES PATENTS

| Number | Name | Date |
|---|---|---|
| 2,202,271 | Sinclair et al. | May 28, 1940 |
| 2,245,017 | Sinclair | June 10, 1941 |
| 2,140,100 | Boldt et al. | Dec. 13, 1938 |
| 2,008,967 | Rossman | July 23, 1935 |
| 1,904,563 | Strout | Apr. 18, 1933 |

---

Certificate of Correction

Patent No. 2,433,428. December 30, 1947.

HAROLD E. CARNAGUA ET AL.

It is hereby certified that errors appear in the printed specification of the above numbered patent requiring correction as follows: Column 9, line 56, claim 2, after the word "teeth" insert a comma; same line, after "including" strike out the comma; and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.*